United States Patent
Aia et al.

(10) Patent No.: US 12,033,603 B2
(45) Date of Patent: Jul. 9, 2024

(54) METHODS AND APPARATUS FOR PLANE PLANNING FOR OVERLAY COMPOSITION

(71) Applicant: QUALCOMM Incorporated, San Diego, CA (US)

(72) Inventors: Mahesh Aia, San Diego, CA (US); Mohammed Naseer Ahmed, Pickering (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/110,200

(22) Filed: Dec. 2, 2020

(65) Prior Publication Data
US 2022/0172695 A1    Jun. 2, 2022

(51) Int. Cl.
G09G 5/377 (2006.01)
G06T 1/20 (2006.01)

(52) U.S. Cl.
CPC ............. *G09G 5/377* (2013.01); *G06T 1/20* (2013.01); *G09G 2340/125* (2013.01)

(58) Field of Classification Search
CPC ............................. G06T 1/20; G09G 2340/125
See application file for complete search history.

(56) References Cited

U.S. PATENT DOCUMENTS

| | | | | |
|---|---|---|---|---|
| 10,446,119 | B1* | 10/2019 | Lakshmikantha | A63F 13/355 |
| 2007/0285439 | A1* | 12/2007 | King | G09G 5/397 345/638 |
| 2015/0084983 | A1 | 3/2015 | Croxford et al. | |
| 2016/0353130 | A1* | 12/2016 | Hwang | H04N 19/70 |
| 2017/0127012 | A1* | 5/2017 | Marchya | H04N 5/915 |
| 2018/0108110 | A1* | 4/2018 | Cuervo | G06T 15/20 |
| 2018/0152703 | A1* | 5/2018 | Rusanovskyy | H04N 19/70 |
| 2018/0166045 | A1* | 6/2018 | Shah | G09G 5/363 |
| 2018/0189922 | A1* | 7/2018 | Chinnadurai | G06T 1/20 |
| 2020/0143516 | A1* | 5/2020 | Martin | G06T 3/4092 |

FOREIGN PATENT DOCUMENTS

| | | |
|---|---|---|
| EP | 3373131 A1 | 9/2018 |
| WO | 2017004707 A1 | 1/2017 |

OTHER PUBLICATIONS

International Search Report and Written Opinion—PCT/US2021/057834—ISA/EPO—Feb. 16, 2022.

* cited by examiner

*Primary Examiner* — Sing-Wai Wu
*Assistant Examiner* — Khoa Vu
(74) *Attorney, Agent, or Firm* — QUALCOMM Incorporated

(57) ABSTRACT

The present disclosure relates to methods and devices for display processing including an apparatus, e.g., a DPU, a compositor, a compositor backend, a DPU driver, and/or DPU firmware. In some aspects, the apparatus may receive content information for each of one or more layers of a frame. The apparatus may also determine whether the content information for each of the one or more layers includes at least one priority format. Additionally, the apparatus may determine a priority order of the one or more layers when the content information for at least one of the one or more layers includes at least one priority format. The apparatus may also map each of one or more display overlay resources to each of the one or more layers based on the determined priority order of the one or more layers.

22 Claims, 5 Drawing Sheets

METHODS AND APPARATUS FOR PLANE PLANNING FOR OVERLAY COMPOSITION

TECHNICAL FIELD

The present disclosure relates generally to processing systems and, more particularly, to one or more techniques for display processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU), a compositor, a compositor backend, a DPU driver, DPU firmware, a CPU, a GPU, and/or any apparatus that can perform display processing. The apparatus may identify one or more display overlay resources for mapping to each of one or more layers of a frame, where the one or more display overlay resources are included in a DPU. The apparatus may also receive content information for each of one or more layers of a frame. The apparatus may also determine whether the content information for each of the one or more layers includes at least one priority format. Additionally, the apparatus may determine a priority order of the one or more layers when the content information for at least one of the one or more layers includes at least one priority format. The apparatus may also map each of one or more display overlay resources to each of the one or more layers based on the determined priority order of the one or more layers.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
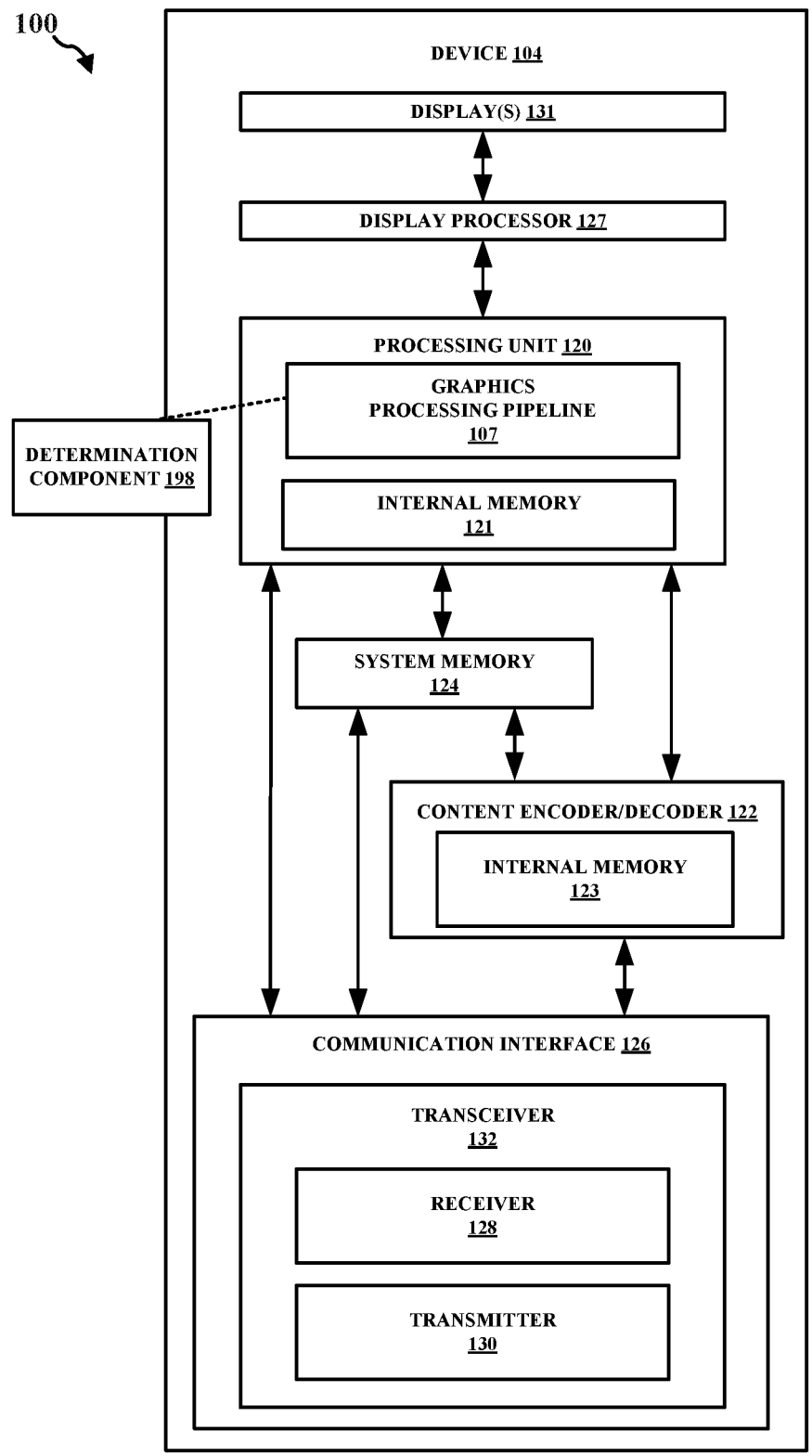
FIG. 1 is a block diagram that illustrates an example content generation system in accordance with one or more techniques of this disclosure.

Some aspects of display processing may include a limited number of display hardware resources, e.g., DPU pipes, that are available to perform a composition process on a DPU. In instances when the number of DPU pipes are limited and/or a subset of DPU pipes are capable of specialized operations, e.g., tone-mapping and inline rotation, this may result in a sub-optimal assignment for high value use cases, e.g., high definition (HD) or high dynamic range (HDR) video playback. Certain types of application use cases, e.g., HD or HDR video playback, may not be processed by a DPU, e.g., processed at a GPU, intermittently due to non-availability of DPU hardware overlays or pipes. For instance, this may cause an inconsistent visual experience to the user, as processing algorithms on a GPU may differ from those on a DPU. In some application use cases, some display layer properties of a frame may be known by a DPU in advance of the composition cycle. In such cases, it may be advantageous for a producer to signal this information to the DPU or compositor in advance, so that optimal DPU resources may be reserved for high value use cases. Additionally, certain applications or use cases may be prioritized over other applications or use cases during the composition process. Aspects of the present disclosure may provide information, e.g., advanced look-ahead information, for DPUs to prioritize certain types of display processing applications or use cases, such as by assigning these use cases to DPU pipes. For example, aspects of the present disclosure may provide certain information in advance of a composition cycle, such as the color space of the layers, the pixel format of the layers, and/or the destination dimensions of the window rendering the video. Aspects of the present disclosure may leverage such look-ahead information in order to optimize resource planning for overlay composition and/or ensure a consistent user experience.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to identify one or more display overlay resources for mapping to each of one or more layers of a frame, where the one or more display overlay resources are included in a DPU. The determination component 198 can also be configured to receive content information for each of one or more layers of a frame. The determination component 198 can also be configured to determine whether the content information for each of the one or more layers includes at least one priority format. The determination component 198 can also be configured to determine a priority order of the one or more layers when the content information for at least one of the one or more layers includes at least one priority format. The determination component 198 can also be configured to map each of one or more display overlay resources to each of the one or more layers based on the determined priority order of the one or more layers.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
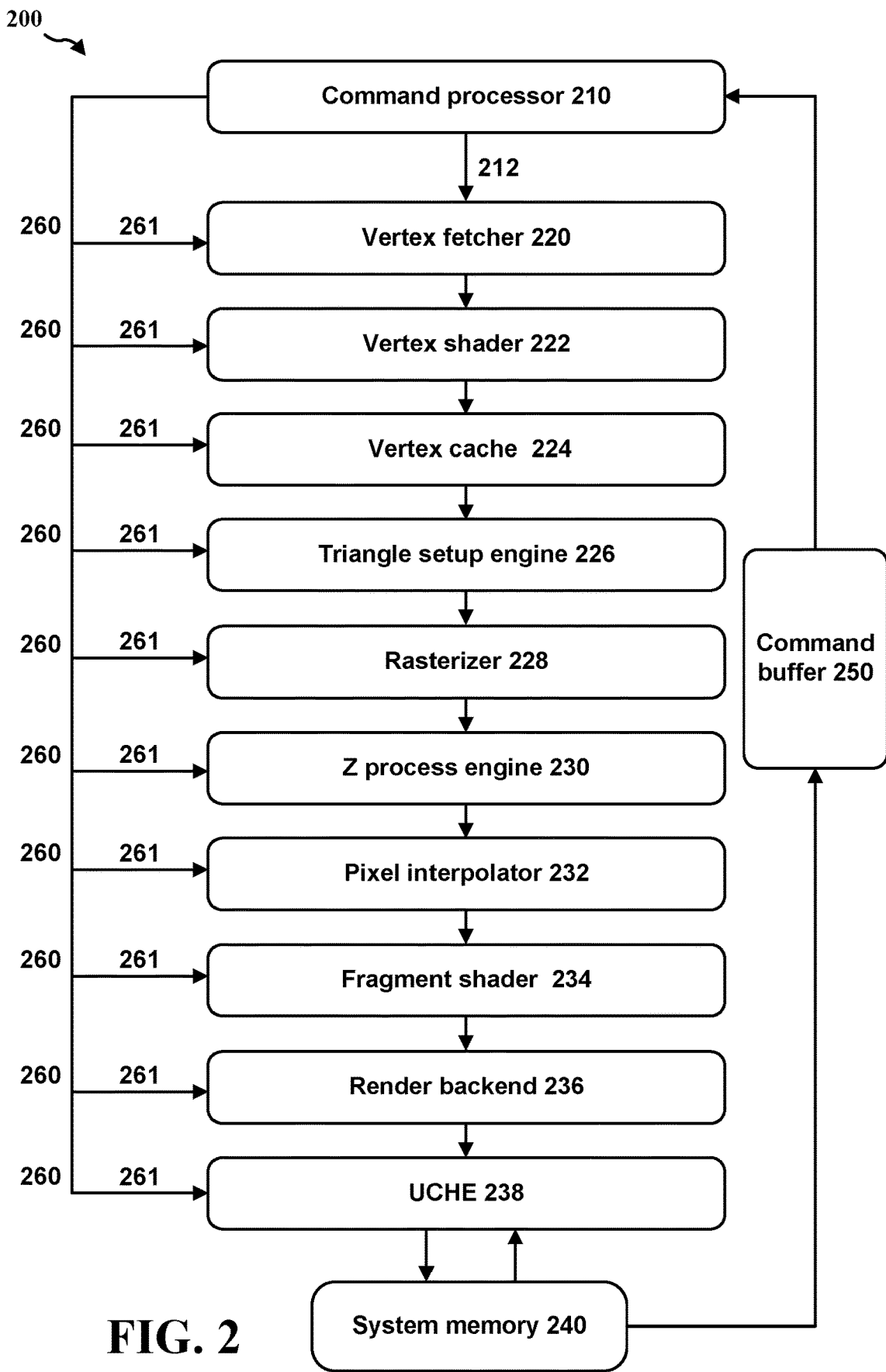
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Some aspects of display processing may include certain types of composition or display strategies for display processing units (DPUs). For instance, the composition of display layers may include combining each of the display layers into a final display frame prior to display at a panel. In some implementations of display processing, e.g., a composition pipeline including overlay-based DPU compositor hardware, DPU hardware resources or pipes may be assigned at the start of a draw cycle. These types of assignments may occur without advance knowledge of a use case, as well as in time to be transferred to the display panel.

DPUs may perform a number of processes, such as image processing, combining, or composition, prior to transmitting an image or frame with a number of layers to a display panel. DPUs may also include a number of pipes or applications in order to process layers of an image or frame. For instance, there may be a number of pipes or applications, e.g., four (4) pipes, in order to process a number of layers in a frame or image, e.g., eight (8) layers. These pipes or applications may perform a number of display processing steps, such as downscaling or upscaling, tone mapping, etc. Some of these display processing steps may include a higher priority compared to other display processing steps, e.g., high definition (HD) or high dynamic range (HDR) video playback.

In some aspects, there may be a limited number of display hardware resources, e.g., DPU pipes, that are available to perform a composition process on a DPU. As such, the number of applications or resources may be limited during the composition process. In instances when the number of DPU pipes are limited and/or a subset of DPU pipes are capable of specialized operations, e.g., tone-mapping and inline rotation, this may result in a sub-optimal assignment for high value use cases, e.g., high definition (HD) or high dynamic range (HDR) video playback. Accordingly, a high value use case may receive a sub-optimal assignment, or in some cases may not be assigned to a DPU pipe.

In some instances, a DPU or compositor may not be aware of any characteristics of an application or use case. As such, the DPU or compositor may treat each application or use case the same. Further, the DPU or compositor may not be aware of the corresponding display processing resource for each application or use case. If each of the application layers do not correspond to a display processing resource, then the DPU may not be able to handle the composition, so the composition may be handled by, or fall back to, the GPU. This may result in an increased overhead or power utilized by the GPU. Further, the processing algorithms may be different at a GPU compared to a DPU, such that upscaling or downscaling may be utilized in order to perform the display processing.

As indicated above, certain types of application use cases, e.g., HD or HDR video playback, may not be processed by a DPU, e.g., processed at a GPU, due to the unavailability of DPU hardware overlays or pipes. For instance, this may cause an inconsistent visual experience to the user as processing algorithms on a GPU may differ from those on a DPU. Further, this issue may be compounded when more than one display is connected due to increased DPU pipe contention.

In some application use cases, some of the display layer properties of a frame may be known by a DPU in advance of the composition cycle. For example, the color space of the layers, the pixel format of the layers, and/or the destination dimensions of the window rendering a video may be known to the DPU prior to the composition cycle. In such cases, it may be advantageous for a producer to signal this information to the DPU or compositor in advance, so that optimal DPU resources may be reserved for high value use cases. Additionally, certain applications or use cases may be prioritized over other applications or use cases during the composition process. For example, the DPU pipes may be prioritized for processing certain use cases, e.g., HD or HDR video playback, over other use cases.

Some aspects of display processing may include multiple display use cases or high resolution display use cases. Based on this, it may be beneficial to provide advanced look-ahead information for DPUs to prioritize certain types of display processing applications or use cases, e.g., by assigning these use cases to DPU pipes. For instance, it may be beneficial to leverage such look-ahead information to optimize resource planning for overlay composition and ensure a consistent user experience. Accordingly, it may be beneficial to prioritize certain applications or use cases compared to other applications or use cases during the composition process. For example, it may be beneficial to reserve or assign certain DPU hardware overlay resources or pipes to process certain types of display processing applications, e.g., HD or HDR video playback. That is, it may be beneficial to optimally allocate limited resources, such as DPU hardware overlay resources or pipes, to high priority use cases or display processing applications.

Aspects of the present disclosure may include information, e.g., advanced look-ahead information, for DPUs to prioritize certain types of display processing applications or use cases, such as by assigning these use cases to DPU pipes. For example, aspects of the present disclosure may provide certain information in advance of a composition cycle, such as the color space of frame layers, the pixel format of the layers, and/or the destination dimensions of a window rendering the video. Aspects of the present disclosure may leverage such look-ahead information in order to optimize resource planning for overlay composition and ensure a consistent user experience.

Additionally, aspects of the present disclosure may apply this look-ahead information to certain use cases, e.g., multiple display use cases or high resolution display use cases. Aspects of the present disclosure may also prioritize certain applications over other applications during the composition process. For example, aspects of the present disclosure may reserve or assign certain DPU hardware overlay resources or pipes to process certain types of display processing applications or use cases, e.g., HD or HDR video playback. As such, aspects of the present disclosure may optimally allocate limited resources, such as DPU hardware overlay resources or pipes, to high priority use cases or display processing applications.

In some instances, aspects of the present disclosure may define a prioritization or feed-forward step where certain information, e.g., early plane data from a producer or video decoder, is fed to the compositor in advance to plan a number of display pipeline stages. Additionally, aspects of the present disclosure may set or lock the DPU hardware overlay resources or pipes for optimal composition of high value use cases, such as HD or HDR video playback. For instance, display content may be decoded in advance, e.g., HD or HDR metadata, and the layer properties may be fed to the compositor for prioritization of DPU hardware overlay resources or pipes. Any added pipeline stages that result from such planning can further be utilized by aspects of the present disclosure to accomplish offline pre-processing of layers that may otherwise have been assigned to GPU composition based on DPU processing limits.

Aspects of the present disclosure may also include different steps or processes for certain types of use cases, e.g., HD or HDR media use cases. For instance, at the time of media pipeline initialization, a video decoder may detect HDR metadata in the content and set the rendering window properties accordingly. Additionally, a window manager may inform or instruct the compositor regarding certain layer properties, e.g., the color space, destination region of interest (ROI) size, and/or pixel format information, of the imminent media playback use case. The compositor may then utilize this information to assign or prioritize layers to DPU hardware overlay resources or pipes.

In some aspects of the present disclosure, a compositor may utilize the above information to gather co-incident layer data for use cases, e.g., HD or HDR use cases. For example, some use cases may specify that each co-incident layer is to be tone-mapped together to a working blend space. The compositor may then set or lock the layer set, i.e., perform a lock call, with a compositor backend. Further, the compositor backend may use the lock call to reserve dedicated DPU hardware overlay resources for the pre-identified layer set. Once the use case begins, the compositor backend may assign the reserved hardware overlay resources for the locked layer set.

In some instances, any new intermittent layers that arrive during a use case, e.g., updates or notifications, may be prioritized at a lower rate and be assigned or routed to composition at the GPU. As indicated above, the high priority layers may be assigned to composition at the DPU hardware overlay resources or pipes. Moreover, the compositor may unlock the DPU hardware overlay resources dedicated for the use case in certain instances. For example, the compositor may unlock the DPU hardware overlay resources when a media playback pauses or is transferred to a background activity.

In some aspects, on an external display, a high value use case, such as HDR video, may be targeted to a specific display. The foreknowledge of this information from the application side may allow aspects of the present disclosure to preemptively prioritize the correct DPU resources to the correct display. The proposal may allow aspects of the present disclosure to obtain sufficient lead time to perform a preprocessing of layers or perform other offline operations. In some cases, layers that may have otherwise been assigned or routed to a GPU, e.g., a blur layer, a highly downscaled layer, or other non-standard effect, may be targeted to an offline processing path. In order to do so, aspects of the present disclosure may utilize certain engines, e.g., a writeback engine or a blit engine, to enable DPU composition of such layers, rather than GPU composition. By doing so, this may result in an improved quality and/or power savings at the DPU.

Figure 3:
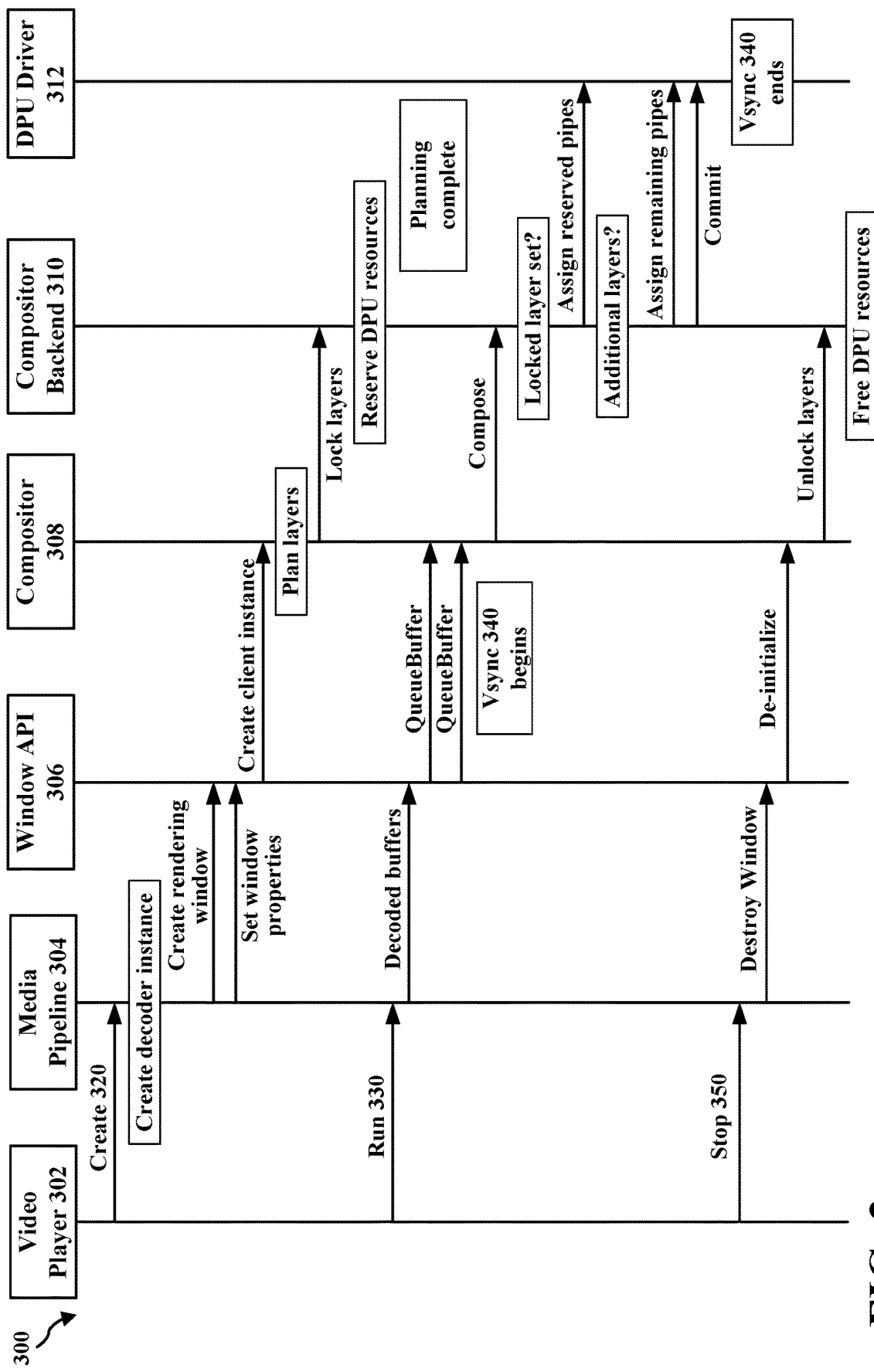
FIG. 3 illustrates an example communication flow diagram of display processing in accordance with one or more techniques of this disclosure.

FIG. 3 illustrates a communication flow diagram 300 of display processing in accordance with one or more techniques of this disclosure. As shown in FIG. 3, diagram 300 includes video player 302, media pipeline 304, window application program interface (API) 306, compositor 308, compositor backend 310, and DPU driver 312. Diagram 300 includes a number of components that are utilized in display processing.

At 320, video player 302 can instruct media pipeline 304 to create, such that media pipeline 304 can create a decoder instance. Media pipeline 304 may then instruct window API 306 to create a rendering window and set window properties. Window API 306 can then instruct compositor 308 to create a client instance. Compositor 308 can then plan the layers, and instruct compositor backend 310 to lock the layers. Compositor backend 310 can then reserve DPU resources. After this, the planning stage can be complete.

At 330, video player 302 can instruct media pipeline 304 to run. Media pipeline 304 may then transmit decoded buffers to window API 306. Window API 306 may then transmit the queueBuffer to compositor 308. Vertical synchronization (Vsync) 340 may then begin. Additionally, compositor 308 may instruct compositor backend 310 to compose. Next, compositor backend 310 may determine if there is a locked layer set. Compositor backend 310 may instruct the DPU driver 312 to assign the reserved pipes. Further, compositor backend 310 may determine if there are additional layers. Compositor backend 310 may instruct the DPU driver 312 to assign the remaining pipes, as well as to commit. After this, Vsync 340 may end.

At 350, video player 302 can instruct media pipeline 304 to stop. Media pipeline 304 may then transmit a destroy window to window API 306. Window API 306 may then instruct compositor 308 to de-initialize. Compositor 308 may then transmit unlocked layers to compositor backend 310. After this, compositor backend 310 may free the DPU resources.

Aspects of the present disclosure may include a number of benefits or advantages. For instance, aspects of the present disclosure can minimize the routing or assignment of high value use cases to composition at a GPU, such as HD or HDR video playback. By doing so, aspects of the present disclosure may improve the composition quality or power savings at a DPU. Additionally, aspects of the present disclosure may provide an improved quality and/or user experience for display processing.

Figure 4:
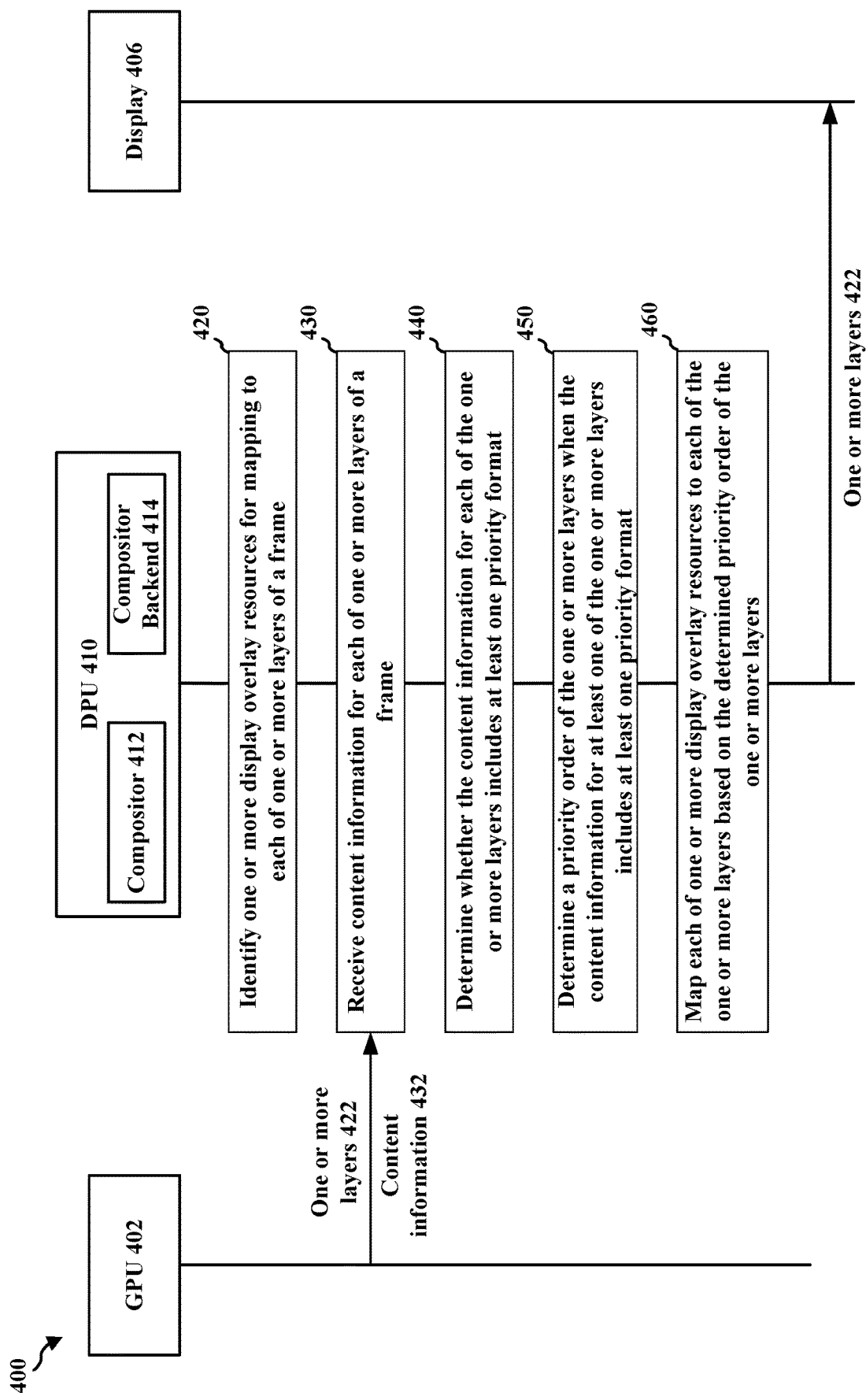
FIG. 4 illustrates an example communication flow diagram of display processing in accordance with one or more techniques of this disclosure.

FIG. 4 illustrates a communication flow diagram 400 of display processing in accordance with one or more techniques of this disclosure. As shown in FIG. 4, diagram 400 includes GPU 402, DPU 410 including compositor 412 and compositor backend 414, and display 406. The DPU 410 may include a number of different components, such as compositor 412, compositor backend 414, a DPU driver, and/or DPU firmware.

At 420, DPU 410, such as compositor 412 or compositor backend 414, may identify one or more display overlay resources for mapping to each of one or more layers of a frame, e.g., one or more layers 422. The one or more display overlay resources may be included in a DPU, e.g., DPU 410. Also, the one or more layers, e.g., one or more layers 422, may correspond to at least one of one or more application layers or one or more system user interface (UI) layers.

At 430, DPU 410, such as compositor 412 or compositor backend 414, may receive content information, e.g., content information 432, for each of one or more layers of a frame, e.g., one or more layers 422. In some instances, the content information, e.g., content information 432, may include one or more content properties of each of the one or more layers, e.g., one or more layers 422. The one or more content properties may include at least one of content metadata, pixel metadata, dimension metadata, or effects metadata.

At 440, DPU 410, such as compositor 412 or compositor backend 414, may determine whether the content information, e.g., content information 432, for each of the one or more layers, e.g., one or more layers 422, includes at least one priority format. The at least one priority format may include at least one of high definition (HD) video, high dynamic range (HDR) video, HD video playback, HDR video playback, video playback, video recording, at least one application use case, or at least one prominent display activity. Also, the at least one priority format may include a priority format order, where the priority format order may be configurable or adjustable.

At 450, DPU 410, such as compositor 412 or compositor backend 414, may determine a priority order of the one or more layers, e.g., one or more layers 422, when the content information, e.g., content information 432, for at least one of the one or more layers includes at least one priority format. The priority order of the one or more layers, e.g., one or more layers 422, may be determined by at least one of a DPU, e.g., DPU 410, a compositor, e.g., compositor 412, a compositor backend, e.g., compositor backend 414, a DPU driver, or DPU firmware.

At 460, DPU 410, such as compositor 412 or compositor backend 414, may map each of one or more display overlay resources to each of the one or more layers, e.g., one or more layers 422, based on the determined priority order of the one or more layers. For instance, the one or more display overlay resources may be assigned to each of the one or more layers based on the priority order. The one or more display overlay resources may correspond to at least one of one or more DPU pipes, one or more DPU engines, one or more DPU clocks, or a DPU memory bandwidth. In some aspects, each of the one or more display overlay resources may be mapped to each of the one or more layers, e.g., one or more layers 422, based on pixel properties of the one or more layers when the content information, e.g., content information 432, for all of the one or more layers does not include at least one priority format. In some instances, each of the one or more layers, e.g., one or more layers 422, may be processed by the mapped display overlay resource at a DPU, e.g., DPU 410.

Moreover, the one or more layers, e.g., one or more layers 422, may be transmitted to a display panel, e.g., display 406, upon being processed by the mapped display overlay resource at the DPU, e.g., DPU 410. For example, DPU 410 may transmit the one or more layers 422 to the display panel, e.g., display 406, upon processing the one or more layers 422. Likewise, display 406 may receive the one or more layers 422 from DPU 410.

Figure 5:
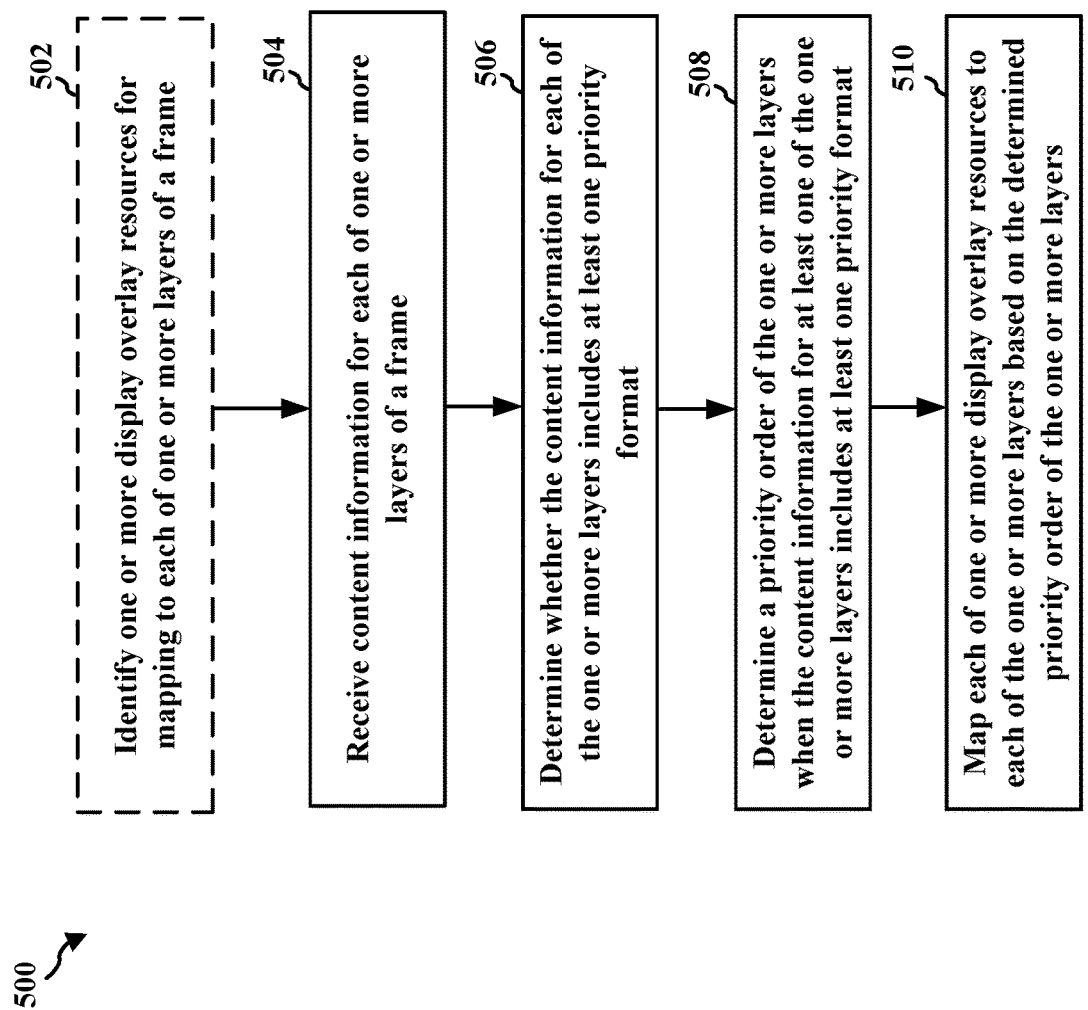
FIG. 5 illustrates an example flowchart of an example method in accordance with one or more techniques of this disclosure.

FIG. 5 illustrates a flowchart 500 of an example method in accordance with one or more techniques of this disclosure. The method may be performed by an apparatus such as a display processing unit (DPU), a compositor, a compositor backend, a DPU driver, DPU firmware, a CPU, a GPU, and/or any apparatus that can perform display processing.

At 502, the apparatus may identify one or more display overlay resources for mapping to each of one or more layers of a frame, where the one or more display overlay resources are included in a DPU, as described in connection with the examples in FIGS. 3 and 4. The one or more layers may correspond to at least one of one or more application layers or one or more system user interface (UI) layers, as described in connection with the examples in FIGS. 3 and 4.

At 504, the apparatus may receive content information for each of one or more layers of a frame, as described in connection with the examples in FIGS. 3 and 4. In some instances, the content information may include one or more content properties of each of the one or more layers, as described in connection with the examples in FIGS. 3 and 4. The one or more content properties may include at least one of content metadata, pixel metadata, dimension metadata, or effects metadata, as described in connection with the examples in FIGS. 3 and 4.

At 506, the apparatus may determine whether the content information for each of the one or more layers includes at least one priority format, as described in connection with the examples in FIGS. 3 and 4. The at least one priority format may include at least one of high definition (HD) video, high dynamic range (HDR) video, HD video playback, HDR video playback, video playback, video recording, at least one application use case, or at least one prominent display activity, as described in connection with the examples in FIGS. 3 and 4. Also, the at least one priority format may include a priority format order, where the priority format order may be configurable or adjustable, as described in connection with the examples in FIGS. 3 and 4.

At 508, the apparatus may determine a priority order of the one or more layers when the content information for at least one of the one or more layers includes at least one priority format, as described in connection with the examples in FIGS. 3 and 4. The priority order of the one or more layers may be determined by at least one of a display processing unit (DPU), a compositor, a compositor backend, a DPU driver, or DPU firmware, as described in connection with the examples in FIGS. 3 and 4.

At 510, the apparatus may assign or map each of one or more display overlay resources to each of the one or more layers based on the determined priority order of the one or more layers, as described in connection with the examples in FIGS. 3 and 4. The one or more display overlay resources may correspond to at least one of one or more DPU pipes, one or more DPU engines, one or more DPU clocks, or a DPU memory bandwidth, as described in connection with the examples in FIGS. 3 and 4. In some aspects, each of the one or more display overlay resources may be mapped to each of the one or more layers based on pixel properties of the one or more layers when the content information for all of the one or more layers does not include at least one priority format, as described in connection with the examples in FIGS. 3 and 4. In some instances, each of the one or more layers may be processed by the mapped display overlay resource at a display processing unit (DPU), as described in connection with the examples in FIGS. 3 and 4. Moreover, the one or more layers may be transmitted to a display panel upon being processed by the mapped display overlay resource at the DPU, as described in connection with the examples in FIGS. 3 and 4.

In one configuration, a method or apparatus for display processing is provided. The apparatus may be a DPU, a compositor, a compositor backend, a DPU driver, DPU firmware, a CPU, a GPU or some other apparatus or processor that can perform display processing. In one aspect, the apparatus may be the processing unit 120 within the device 104, or may be some other hardware within device 104 or another device. The apparatus may include means for receiving content information for each of one or more layers of a frame. The apparatus may also include means for determining whether the content information for each of the one or more layers includes at least one priority format. The apparatus may also include means for determining a priority order of the one or more layers when the content information for at least one of the one or more layers includes at least one priority format. The apparatus may also include means for mapping each of one or more display overlay resources to each of the one or more layers based on the determined priority order of the one or more layers. The apparatus may also include means for identifying the one or more display overlay resources for mapping to each of the one or more layers of the frame, where the one or more display overlay resources are included in a display processing unit (DPU).

The subject matter described herein can be implemented to realize one or more benefits or advantages. For instance, the described display processing techniques can be used by a DPU, a compositor, a compositor backend, a DPU driver, DPU firmware, a CPU, a GPU, or some other apparatus or processor that can perform display processing to implement the overlay composition techniques described herein. This can also be accomplished at a low cost compared to other display processing techniques. Moreover, the display processing techniques herein can improve or speed up display processing or execution. Further, the display processing techniques herein can improve resource or data utilisation and/or resource efficiency. Additionally, aspects of the present disclosure can utilize overlay composition techniques in order to save power, improve processing time, reduce latency, and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

The following aspects are illustrative only and may be combined with other aspects or teachings described herein, without limitation.

Aspect 1 is a method of display processing. The method includes receiving content information for each of one or more layers of a frame; determining whether the content information for each of the one or more layers includes at least one priority format; determining a priority order of the one or more layers when the content information for at least one of the one or more layers includes at least one priority format; and mapping each of one or more display overlay resources to each of the one or more layers based on the determined priority order of the one or more layers.

Aspect 2 is the method of aspect 1, where the one or more display overlay resources correspond to at least one of one or more display processing unit (DPU) pipes, one or more DPU engines, one or more DPU clocks, or a DPU memory bandwidth.

Aspect 3 is the method of any of aspects 1 and 2, where the content information includes one or more content properties of each of the one or more layers.

Aspect 4 is the method of any of aspects 1 to 3, where the one or more content properties include at least one of content metadata, pixel metadata, dimension metadata, or effects metadata.

Aspect 5 is the method of any of aspects 1 to 4, further comprising identifying the one or more display overlay resources for mapping to each of the one or more layers of the frame, where the one or more display overlay resources are included in a display processing unit (DPU).

Aspect 6 is the method of any of aspects 1 to 5, where the at least one priority format includes at least one of high definition (HD) video, high dynamic range (HDR) video, HD video playback, HDR video playback, video playback, video recording, at least one application use case, or at least one prominent display activity.

Aspect 7 is the method of any of aspects 1 to 6, where the priority order of the one or more layers are determined by at least one of a display processing unit (DPU), a compositor, a compositor backend, a DPU driver, or DPU firmware.

Aspect 8 is the method of any of aspects 1 to 7, where the at least one priority format includes a priority format order, the priority format order being configurable or adjustable.

Aspect 9 is the method of any of aspects 1 to 8, where the one or more layers correspond to at least one of one or more application layers or one or more system user interface (UI) layers.

Aspect 10 is the method of any of aspects 1 to 9, where each of the one or more display overlay resources are mapped to each of the one or more layers based on pixel properties of the one or more layers when the content information for all of the one or more layers does not include at least one priority format.

Aspect 11 is the method of any of aspects 1 to 10, where each of the one or more layers are processed by the mapped display overlay resource at a display processing unit (DPU).

Aspect 12 is the method of any of aspects 1 to 11, where the one or more layers are transmitted to a display panel upon being processed by the mapped display overlay resource at the DPU.

Aspect 13 is an apparatus for display processing including means for implementing a method as in any of aspects 1 to 12.

Aspect 14 is an apparatus for display processing including at least one processor coupled to a memory and configured to implement a method as in any of aspects 1 to 12.

Aspect 15 is a computer-readable medium storing computer executable code, where the code when executed by a processor causes the processor to implement a method as in any of aspects 1 to 12.

What is claimed is:
1. A method of display processing, comprising:
identifying one or more display overlay resources for mapping to one or more layers of a frame;
receiving content information, from a graphics processing unit (GPU), for each of the one or more layers of the frame;
determining, by a display processing unit (DPU), that the content information for at least one layer of the one or more layers includes at least one priority format, wherein the at least one priority format includes at least one of high definition (HD) video, high dynamic range (HDR) video, HD video playback, HDR video playback, video recording, at least one application use case, or at least one prominent display activity, wherein the at least one priority format includes a priority format order that is configurable;
determining a priority order of the one or more layers based on the content information for the at least one layer of the one or more layers including the at least one priority format, wherein the at least one layer includes a higher priority in the priority order than at least one other layer of the one or more layers; and
mapping each of the one or more display overlay resources to a corresponding layer of the one or more layers based on the determined priority order of the one or more layers, wherein the at least one layer is mapped to at least one first display overlay resource at the DPU of the one or more display overlay resources and the at least one other layer is mapped to at least one second display overlay resource at the GPU of the one or more display overlay resources, wherein the at least one first display overlay resource at the DPU is different from the at least one second display overlay resource at the GPU, wherein the at least one layer is mapped to the at least one first display overlay resource at the DPU based on a reservation at the DPU for the at least one first display overlay resource,
wherein the content information includes one or more content properties of each of the one or more layers,
wherein the one or more content properties include at least one of content metadata, pixel metadata, dimension metadata, or effects metadata, and
wherein each of the one or more layers are processed by the mapped display overlay resource at the DPU.

2. The method of claim 1, wherein the one or more display overlay resources correspond to at least one of one or more DPU pipes, one or more DPU engines, one or more DPU clocks, or a DPU memory bandwidth.

3. The method of claim 1, wherein the one or more display overlay resources are included in the DPU.

4. The method of claim 1, wherein the priority order of the one or more layers are determined by at least one of the DPU, a compositor, a compositor backend, a DPU driver, or DPU firmware.

5. The method of claim 1, wherein the one or more layers correspond to at least one of one or more application layers or one or more system user interface (UI) layers.

6. The method of claim 1, wherein each of the one or more display overlay resources are mapped to each of the one or more layers based on pixel properties of the one or more layers when the content information for all of the one or more layers does not include the at least one priority format.

7. The method of claim 1, wherein the one or more layers are transmitted to a display panel upon being processed by the mapped display overlay resource at the DPU.

8. An apparatus for display processing, comprising:
memory; and
at least one processor coupled to the memory and configured to:
identify one or more display overlay resources for mapping to one or more layers of a frame;
receive content information, from a graphics processing unit (GPU), for each of the one or more layers of the frame;
determine, by a display processing unit (DPU), that the content information for at least one layer of the one or more layers includes at least one priority format, wherein the at least one priority format includes at least one of high definition (HD) video, high dynamic range (HDR) video, HD video playback, HDR video playback, video recording, at least one application use case, or at least one prominent display activity, wherein the at least one priority format includes a priority format order that is configurable;
determine a priority order of the one or more layers based on the content information for the at least one layer of the one or more layers including the at least one priority format, wherein the at least one layer includes a higher priority in the priority order than at least one other layer of the one or more layers; and
map each of the one or more display overlay resources to a corresponding layer of the one or more layers based on the determined priority order of the one or more layers, wherein the at least one layer is mapped to at least one first display overlay resource at the DPU of the one or more display overlay resources and the at least one other layer is mapped to at least one second display overlay resource at the GPU of the one or more display overlay resources, wherein the at least one first display overlay resource at the DPU is different from the at least one second display overlay resource at the GPU, wherein the at least one layer is mapped to the at least one first display overlay resource at the DPU based on a reservation at the DPU for the at least one first display overlay resource,
wherein the content information includes one or more content properties of each of the one or more layers,
wherein the one or more content properties include at least one of content metadata, pixel metadata, dimension metadata, or effects metadata, and
wherein each of the one or more layers are processed by the mapped display overlay resource at the DPU.

9. The apparatus of claim 8, wherein the one or more display overlay resources correspond to at least one of one or more DPU pipes, one or more DPU engines, one or more DPU clocks, or a DPU memory bandwidth.

10. The apparatus of claim 8, wherein the one or more display overlay resources are included in the DPU.

11. The apparatus of claim 8, wherein the at least one processor is configured to determine the priority order of the one or more layers with at least one of the DPU, a compositor, a compositor backend, a DPU driver, or DPU firmware.

12. The apparatus of claim 8, wherein the one or more layers correspond to at least one of one or more application layers or one or more system user interface (UI) layers.

13. The apparatus of claim 8, wherein the at least one processor is configured to map each of the one or more display overlay resources to the corresponding layer of the one or more layers based on pixel properties of the one or more layers when the content information for all of the one or more layers does not include the at least one priority format.

14. The apparatus of claim 8, wherein the one or more layers are transmitted to a display panel upon being processed by the mapped display overlay resource at the DPU.

15. An apparatus for display processing, comprising:
means for identifying one or more display overlay resources for mapping to one or more layers of a frame;
means for receiving content information, from a graphics processing unit (GPU), for each of the one or more layers of the frame;
means for determining, by a display processing unit (DPU), that the content information for at least one layer of the one or more layers includes at least one priority format, wherein the at least one priority format includes at least one of high definition (HD) video, high dynamic range (HDR) video, HD video playback, HDR video playback, video recording, at least one application use case, or at least one prominent display activity, wherein the at least one priority format includes a priority format order that is configurable;

means for determining a priority order of the one or more layers based on the content information for the at least one layer of the one or more layers including the at least one priority format, wherein the at least one layer includes a higher priority in the priority order than at least one other layer of the one or more layers; and means for mapping each of the one or more display overlay resources to a corresponding layer of the one or more layers based on the determined priority order of the one or more layers, wherein the at least one layer is mapped to at least one first display overlay resource at the DPU of the one or more display overlay resources and the at least one other layer is mapped to at least one second display overlay resource at the GPU of the one or more display overlay resources, wherein the at least one first display overlay resource at the DPU is different from the at least one second display overlay resource at the GPU, wherein the at least one layer is mapped to the at least one first display overlay resource at the DPU based on a reservation at the DPU for the at least one first display overlay resource, wherein the content information includes one or more content properties of each of the one or more layers, wherein the one or more content properties include at least one of content metadata, pixel metadata, dimension metadata, or effects metadata, and wherein each of the one or more layers are processed by the mapped display overlay resource at the DPU.

16. The apparatus of claim 15, wherein the one or more display overlay resources correspond to at least one of one or more DPU pipes, one or more DPU engines, one or more DPU clocks, or a DPU memory bandwidth.

17. The apparatus of claim 15, wherein the one or more display overlay resources are included in the DPU.

18. The apparatus of claim 15, wherein the priority order of the one or more layers are determined by at least one of the DPU, a compositor, a compositor backend, a DPU driver, or DPU firmware.

19. The apparatus of claim 15, wherein the one or more layers correspond to at least one of one or more application layers or one or more system user interface (UI) layers.

20. The apparatus of claim 15, wherein each of the one or more display overlay resources are mapped to each of the one or more layers based on pixel properties of the one or more layers when the content information for all of the one or more layers does not include the at least one priority format.

21. The apparatus of claim 15, wherein each of the one or more layers are processed by the mapped display overlay resource at the DPU.

22. A non-transitory computer-readable medium storing computer executable code for display processing, the code when executed by a processor causes the processor to:

identify one or more display overlay resources for mapping to one or more layers of a frame;

receive content information, from a graphics processing unit (GPU), for each of the one or more layers of the frame;

determine, by a display processing unit (DPU), that the content information for at least one layer of the one or more layers includes at least one priority format, wherein the at least one priority format includes at least one of high definition (HD) video, high dynamic range (HDR) video, HD video playback, HDR video playback, video recording, at least one application use case, or at least one prominent display activity, wherein the at least one priority format includes a priority format order that is configurable;

determine a priority order of the one or more layers based on the content information for the at least one layer of the one or more layers including the at least one priority format, wherein the at least one layer includes a higher priority in the priority order than at least one other layer of the one or more layers; and map each of the one or more display overlay resources to a corresponding layer of the one or more layers based on the determined priority order of the one or more layers, wherein the at least one layer is mapped to at least one first display overlay resource at the DPU of the one or more display overlay resources and the at least one other layer is mapped to at least one second display overlay resource at the GPU of the one or more display overlay resources, wherein the at least one first display overlay resource at the DPU is different from the at least one second display overlay resource at the GPU, wherein the at least one layer is mapped to the at least one first display overlay resource at the DPU based on a reservation at the DPU for the at least one first display overlay resource, wherein the content information includes one or more content properties of each of the one or more layers, wherein the one or more content properties include at least one of content metadata, pixel metadata, dimension metadata, or effects metadata, and wherein each of the one or more layers are processed by the mapped display overlay resource at the DPU.

* * * * *